(12) United States Patent
Hosny et al.

(10) Patent No.: US 9,378,321 B2
(45) Date of Patent: Jun. 28, 2016

(54) APPARATUS AND METHODS FOR PARTITIONING AN INTEGRATED CIRCUIT DESIGN INTO MULTIPLE PROGRAMMABLE DEVICES

(71) Applicant: SILICONPRO INC., Ottawa (CA)

(72) Inventors: Mohamed Samy Hosny, Ottawa (CA); Peter Goharis, Woodlawn (CA)

(73) Assignee: SILICONPRO INC., Ottawa (CA)

( * ) Notice: Subject to any disclaimer, the term of this patent is extended or adjusted under 35 U.S.C. 154(b) by 0 days.

(21) Appl. No.: 14/548,184

(22) Filed: Nov. 19, 2014

(65) Prior Publication Data

US 2015/0143316 A1    May 21, 2015

Related U.S. Application Data

(60) Provisional application No. 61/907,340, filed on Nov. 21, 2013.

(51) Int. Cl.
*G06F 17/50* (2006.01)
(52) U.S. Cl.
CPC ........ *G06F 17/5072* (2013.01); *G06F 17/5027* (2013.01); *G06F 2217/84* (2013.01)
(58) Field of Classification Search
CPC ............ G06F 17/5027; G06F 17/5072; G06F 2217/84
USPC .................................. 716/113, 124, 132, 134
See application file for complete search history.

(56) References Cited

U.S. PATENT DOCUMENTS

| | | | |
|---|---|---|---|
| 6,505,330 B1* | 1/2003 | Osborn ............... | G06F 17/5072 716/113 |
| 7,844,930 B2 | 11/2010 | Pandey et al. | |
| 2008/0175165 A1* | 7/2008 | Tien ........................ | H04W 4/02 370/253 |
| 2012/0297107 A1* | 11/2012 | Mathew .............. | G06F 13/4221 710/313 |
| 2014/0075235 A1* | 3/2014 | Chandhoke ........... | H04J 3/0667 713/401 |
| 2014/0136093 A1* | 5/2014 | Banin ..................... | G01S 5/021 701/300 |
| 2014/0136812 A1* | 5/2014 | Stark ....................... | G06F 13/00 711/211 |

OTHER PUBLICATIONS

SerDes (wikipedia), https://en.wikipedia.org/w/index.php?title=SerDes&oldid=5773632655, pp. 1-4, Sep. 10, 2013.

* cited by examiner

*Primary Examiner* — Vuthe Siek
(74) *Attorney, Agent, or Firm* — IP-MEX Inc.; Victoria Donnelly

(57) ABSTRACT

Methods and systems for partitioning a design across a plurality of programmable logic devices such as Field Programmable Gate Arrays (FPGAs) are provided. The systems include SerDes (SERializer DESerializer) interfaces, such as PCIe, (Peripheral Component Interconnect Express) in the programmable logic devices operably connecting logic blocks of the design. Embodiments include a bridge in each programmable logic device for providing synchronization and deterministic latency of packets sent between the programmable devices.

26 Claims, 13 Drawing Sheets

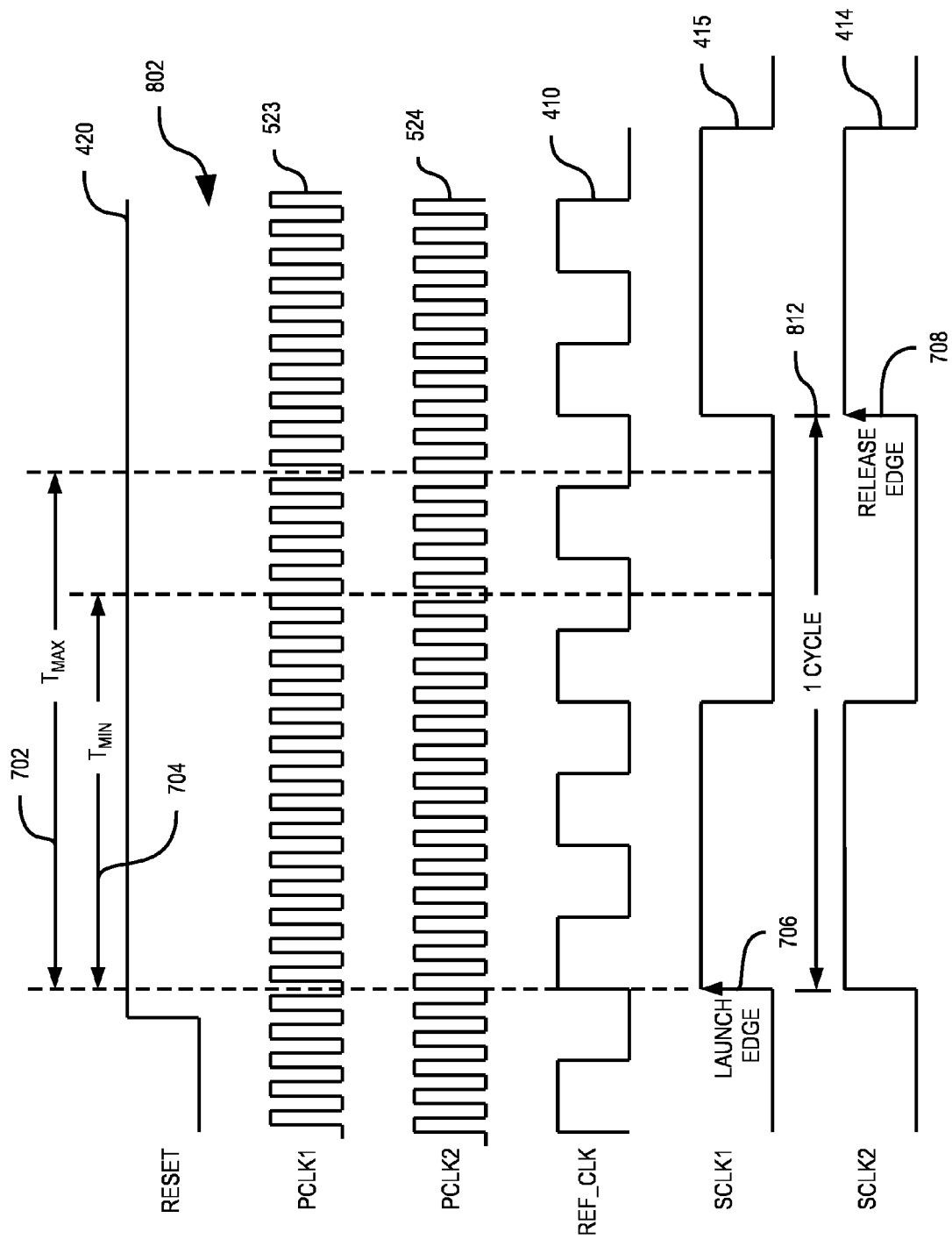

APPARATUS AND METHODS FOR PARTITIONING AN INTEGRATED CIRCUIT DESIGN INTO MULTIPLE PROGRAMMABLE DEVICES

REFERENCE TO RELATED APPLICATIONS

This application claims an invention which was disclosed in Provisional Application No. 61/907,340 filed Nov. 21, 2013 entitled "APPARATUS AND METHODS FOR PARTITIONING AN INTEGRATED CIRCUIT DESIGN INTO MULTIPLE PROGRAMMABLE DEVICES". The benefit under 35 USC §119(e) of the United States provisional application is hereby claimed, and the entire contents of the aforementioned provisional application is hereby incorporated herein by reference.

TECHNICAL FIELD

The present invention relates generally to circuit design partitioning, and more specifically, to partitioning a large circuit design for an integrated circuit into a plurality of programmable devices, such as FPGAs (Field Programmable Gate Arrays) for the purpose of prototyping and testing before fabrication of the integrated circuit.

BACKGROUND

The present disclosure relates generally to integrated circuit design partitioning and prototyping.

In designing modern integrated circuits, a single design may include many transistor based modules such as microprocessors, memory devices and other functions in a single package. These functions are often developed in HDL (Hardware Description Language) design languages such as Verilog (Institute of Electrical and Electronic Engineers standard 1364) and VHDL (Very high speed integrated circuit Hardware Description Language). HDL source code is typically technology independent, that it is independent of the technology of a specific vendor such as of Field Programmable Gate Arrays (FPGA) or Applied Specific Integrated Circuits (ASIC). A logic synthesis and mapping operation is then performed to convert from HDL to a technology specific netlist, which can be used to create circuits in a specific vendor's technology.

In a process of validating the functionality of these integrated circuits, it is often required to prototype the entire integrated circuit in a Field Programmable Gate Array (FPGA) device before fabrication. Very often, however, these FPGA devices are not big enough to accommodate the entire integrated circuit design in a single FPGA device. In such cases, it is required to partition the entire integrated circuit design among multiple FPGA devices.

When a design requires multiple FPGAs, the design must be partitioned across the devices. Partitioning involves assigning portions of the design, i.e. logic functions and corresponding components, to each of the various devices.

A design can be thought of as a collection of hierarchies of logic blocks, with top level logic blocks being composed of lower level logic blocks. FIG. 1A is a diagram illustrating a partitioning of an example design 100 which may be expressed as a netlist, or other software-based circuit representation, as performed by a conventional synthesis tool. The netlist specifies the various logic blocks, or instances, of a design as well as the nets connecting those logic blocks. As shown, the design 100 can include the top level design 110. The design 100 further specifies five different logic hierarchies, in this example, corresponding to logic blocks 111, 112, 113, 114 and 115 respectively. Each logic block includes logic Under Test (LUT) (not shown) and each logic block may include sub-blocks (not shown). Partitioning typically assigns each logic block to a different FPGA, as shown in FIG. 1B. In this case the logic hierarchy represented by block 111 has been assigned to FPGA 121, the logic hierarchy represented by block 112 to FPGA 122, the logic hierarchy represented by block 113 to FPGA 123, the logic hierarchy represented by block 114 to FPGA 124, and the logic hierarchy represented by block 115 to FPGA 125. In addition, wire bus 131 connects I/O pins between FPGA 121 and 122, wire bus 132 connects I/O pins between FPGA 122 and 123, wire bus 133 connects I/O pins between FPGA 123 and 124, wire bus 134 connects I/O pins between FPGA 124 and 125 and wire bus 135 connects I/O pins between FPGA 125 and 121. Each one of these buses may be comprised of hundreds of wires, and typically there is a clock associated with each bus.

Conventional partitioning methods have limitations as to usability and the quality of the solutions that are achieved when partitioning across multiple devices. When partitioning, design constraints must be observed. One such constraint pertains to the number of connections that can be used between partitions, in this case individual FPGAs. Specifically, there cannot be more connections among the partitions than the total number of inputs and outputs (I/Os) available on the FPGAs concerned. When partitioning a design along logic hierarchy boundaries, as illustrated in FIGS. 1A and 1B, many connections required and the partitioning often violates this constraint. That is, the partitioning typically requires more I/Os than are available on the FPGA devices concerned. Violation of this constraint leads to an infeasible partitioning of the design. Many existing partitioning algorithms such as U.S. Pat. No. 7,844,930, Titled: "METHOD AND APPARATUS FOR CIRCUIT PARTITIONING AND TRACE ASSIGNMENT IN CIRCUIT DESIGN", Filed: Jun. 12, 2007, overcome this problem by multiplexing the signals between blocks, hence, reducing the FPGA pins required. This method often results in reduced operating frequency and added complexity.

Another limitation of existing partitioning methods is that the wires that connects the inputs and output pins between the FPGAs have to be implemented in hardware. This implies that any change in the FPGA I/O signals will result in a new hardware implementation, such as a redesign of a printed circuit board (PCB) on which the FPGAs are mounted.

Still another limitation of existing partitioning methods is that timing of signals between the logic blocks in the partitioned design 120 may be substantially different from timing of signals between logic blocks in the original design 100, especially when the original design is implemented in single integrated circuit.

Accordingly, it would be beneficial to provide a method and system for partitioning a design across a plurality of devices in a manner that overcomes the deficiencies described above.

BRIEF DESCRIPTION OF THE DRAWINGS

Further features and advantages of the invention will be apparent from the following description of the embodiment, which is described by way of example only and with reference to the accompanying drawings, in which:

FIGS. 8A and 8B are timing diagrams showing timing of clock signals shown in FIGS. 4 and 5 including a system clock having a maximum frequency.

SUMMARY OF THE INVENTION

Figure 1A:
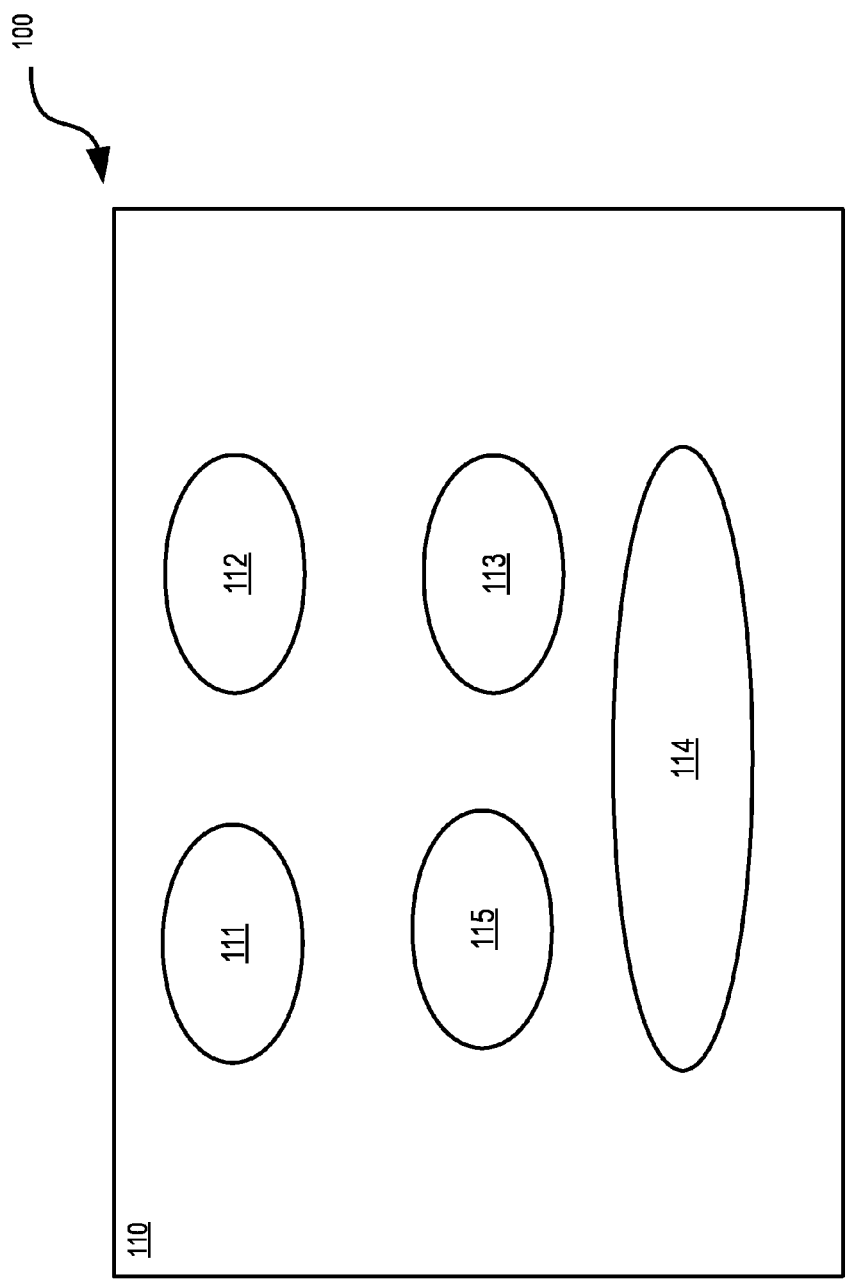
FIG. 1A is a diagram illustrating partitioning of a design into logic blocks as performed by conventional partitioning methods.

The present invention is directed to methods and systems for partitioning a design that is typically in an ASIC (Application Specific Integrated Circuits) device, across plurality of programmable devices such as FPGA (Field Programmable Gate Arrays) for the purpose of prototyping and verification.

According to one aspect of the present invention there is provided a method for partitioning a circuit including: partitioning a circuit into at least a first circuit block and a second circuit block; sending a plurality of packets from the first circuit block and receiving the plurality of packets at the second circuit block; calculating a respective plurality of flight times of the plurality of packets; and delaying a release of a packet received by the second circuit block based on the plurality of flight times for synchronizing the release of the packet.

In some embodiments the partitioning includes programming a first programmable device having a first SerDes (serializer/deserializer) to function as the first block, programming a second programmable device having a second SerDes to function as the second block, and operably connecting the first SerDes and the second SerDes.

In some embodiments the sending further includes sending a plurality of packets having a respective plurality of timestamps from the first SerDes; and the receiving comprises receiving the plurality of packets by the second SerDes.

In some embodiments the calculating includes calculating the respective plurality of flight times of the plurality of packets from the respective plurality of timestamps.

In some embodiments the calculating includes determining a maximum flight time from the respective plurality of flight times.

In some embodiments the calculating includes determining a minimum flight time from the respective plurality of flight times.

In some embodiments the method further comprising calculating a maximum clock frequency as a function of the maximum flight time and the minimum flight time.

In some embodiments the maximum clock frequency is inversely proportional to a difference between the maximum flight time and the minimum flight time.

In some embodiments the delaying the release of the packet received by the second circuit block comprises delaying the release of the packet by at least the maximum flight time.

In some embodiments the method further includes calculating a threshold time which is higher than the maximum flight time; and wherein the delaying the release of the packet received by the second circuit block comprises delaying the release of the packet by one or more threshold times.

According to another aspect of the invention there is provided a system for partitioning a circuit, the system including: a first programmable device having a first SerDes (serializer/deserializer), the first programmable device configured to function as a first block of a circuit; a second programmable device having a second SerDes, the second programmable device configured to function as a second block of the circuit; and an operable connection between the first SerDes and the second SerDes, wherein the first programmable device is configured to: send a plurality of packets from the first SerDes, and wherein the second programmable device is configured to: receive the plurality of packets by the second SerDes; calculate a respective plurality of flight times of the plurality of packets; and delay a release of a packet received by the second circuit block based on the plurality of flight times for synchronizing the release of the packet.

In some embodiments the system is further configured to: determine the plurality of flight times from a respective plurality of timestamps of the plurality of packets; determine a maximum flight time from the respective plurality of flight times; and delay a release of a packet received by the second SerDes by at least the maximum flight time.

In some embodiments a type of the first SerDes and the second SerDes is PCIe (Peripheral Component Interconnect Express).

In some embodiments the second programmable device is further configured to: calculate a threshold time as a fraction of the maximum flight time; and delay a release of a packet received by the second SerDes by one or more threshold times.

In some embodiments the second programmable device is further configured to: determine a minimum flight time from the respective plurality of flight times; and calculate a maximum clock frequency of the second block of the circuit as a function of the maximum flight time and the minimum flight time.

In some embodiments the first programmable device includes a first timer for providing the plurality of timestamps; and the second programmable device comprises a second timer for providing a plurality of capture times and is further configured to calculate the respective plurality of flight times based on the respective plurality of timestamps and the respective plurality of capture times.

In some embodiments the first programmable device and the second programmable device share a common reset signal and a common reference clock signal.

According to yet another aspect of the invention there is provided a method for partitioning a circuit, the method including: partitioning a circuit into at least a first circuit block and a second circuit block; programming a first programmable device having a first SerDes (serializer/deserializer) to function as the first block; programming a second programmable device having a second SerDes to function as the second block; operably connecting the first SerDes and the second SerDes; sending a plurality of packets having a respective plurality of timestamps from the first SerDes; receiving the plurality of packets by the second SerDes; calculating a respective plurality of flight times of the plurality of packets from the respective plurality of timestamps; determining a maximum flight time from the respective plurality of flight times; and delaying a release of a packet received by the second SerDes by at least the maximum flight time for synchronizing the release of the packet.

In some embodiments the method further includes: determining a threshold time from the maximum flight time; and delaying the release of the packet by one or more threshold times for synchronizing the release of the packet.

In some embodiments the method further includes: determining a minimum flight time from the respective plurality of flight times; and calculating a maximum frequency of a clock as a function of the maximum flight time and the minimum flight time wherein a duration of the clock is greater than the maximum flight time.

The accompanying drawings are included to provide a further understanding of the present invention and are incorporated in and constitute a part of this specification. The drawings illustrate some embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Methods and systems for circuit partitioning and synchronization are presented here. In one embodiment of the present invention, a method of partitioning a design across a plurality of FPGAs using High Speed Serializer-Deserializer (SerDes). In general, a SerDes is a hardware construct that converts data on parallel busses into a high speed serial data stream that can be transmitted on a pair of wires, called lanes, that are much fewer than the parallel bus. If more bandwidth is required, more lanes can be added. Another embodiment of the present invention, is an apparatus that uses SerDes to connect between different parts of the design across a plurality of FPGAs.

Figure 1B:
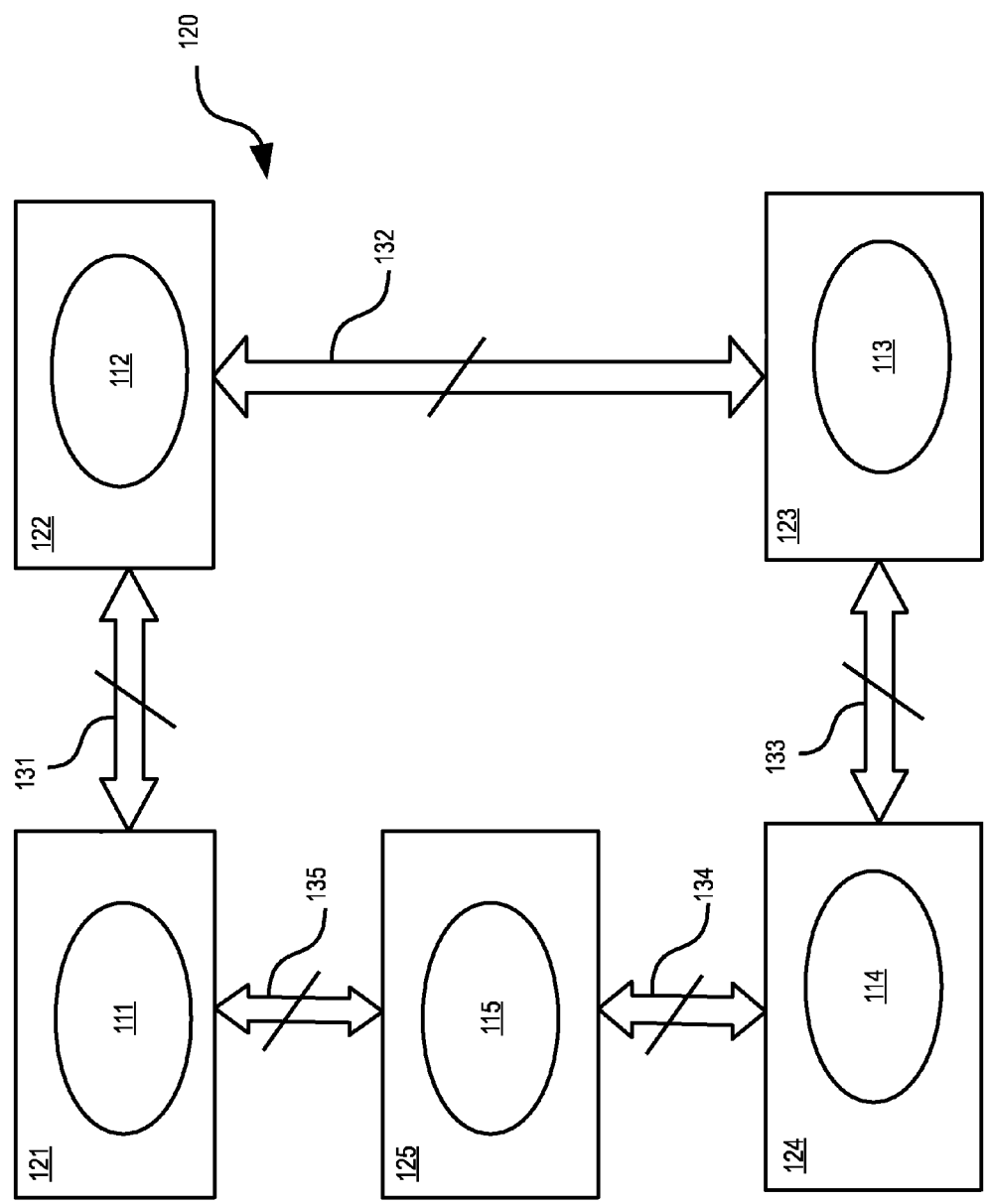
FIG. 1B is a diagram illustrating connection of the logic blocks of the design of FIG. 1A according to conventional partitioning methods.
Figure 2:
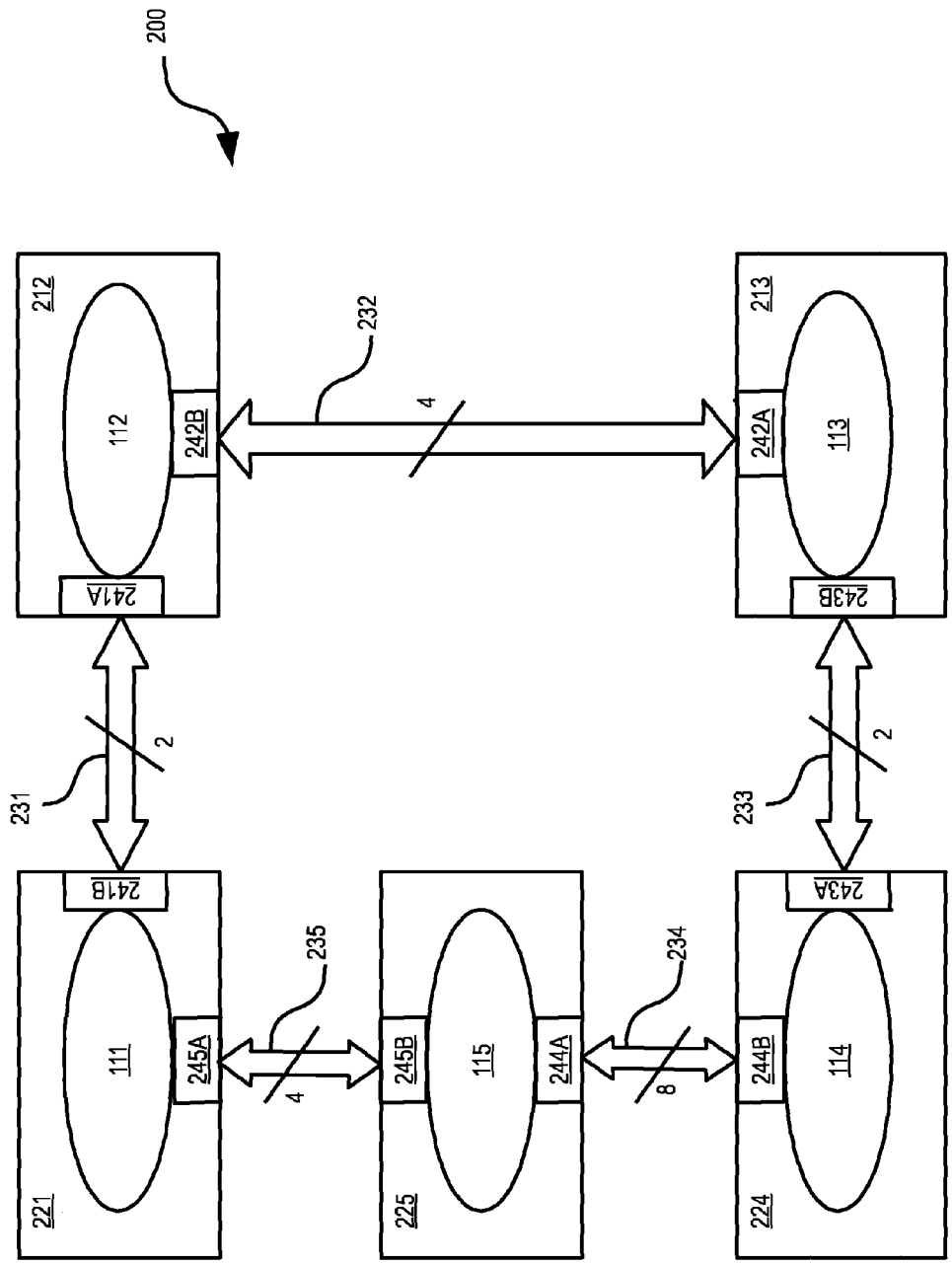
FIG. 2 is a diagram illustrating an example connection of the logic blocks of the design of FIG. 1A according to an embodiment of the present invention.

Referring to FIG. 2, there is shown a diagram 200 of a system wherein the wire bus 131 of FIG. 1B that connects logic block 111 and 112 is replaced by 2 SerDes lanes 231 and SerDes pair 241A,241B, wire bus 132 that connects logic block 111 and 112 is replaced by 4 SerDes lanes 232 and SerDes pair 242A,242B, wire bus 133 that connects logic block 113 and 114 is replaced by 2 SerDes lanes 233 and SerDes pair 243A,243B, wire bus 134 that connects logic block 114 and 115 is replaced by 8 SerDes lanes 234A,234B and SerDes pair 244A,244b and wire bus 135 that connects logic block 115 and 111 is now replaced by 4 SerDes lanes 235 and SerDes pair 245A,235B. The number of SerDes lanes in each case is intended for illustration only. The SerDes pairs 241A,241B to 245A,245B are preferably implemented as hard blocks in the respective FPGAs 311 to 315.

Another embodiment of the present invention, may include a packet based switch, such as PCIe (Peripheral Component Interconnect Express) switch, with high Speed SerDes capabilities, where the high Speed SerDes channel connects the packet switch on one end and the FPGA at the other end. The packet switch logically connects the different parts of the design in the plurality of FPGAs. A destination address is inserted into the header of each packet at the transmit end, such that the switch will examine this address and route it to the correct destination. An advantage of using the packet switch is that the destination address can be programmed using software methods. It is, therefore, not necessary to do any hardware changes if the connectivity between FPGAs is changed.

Figure 3:
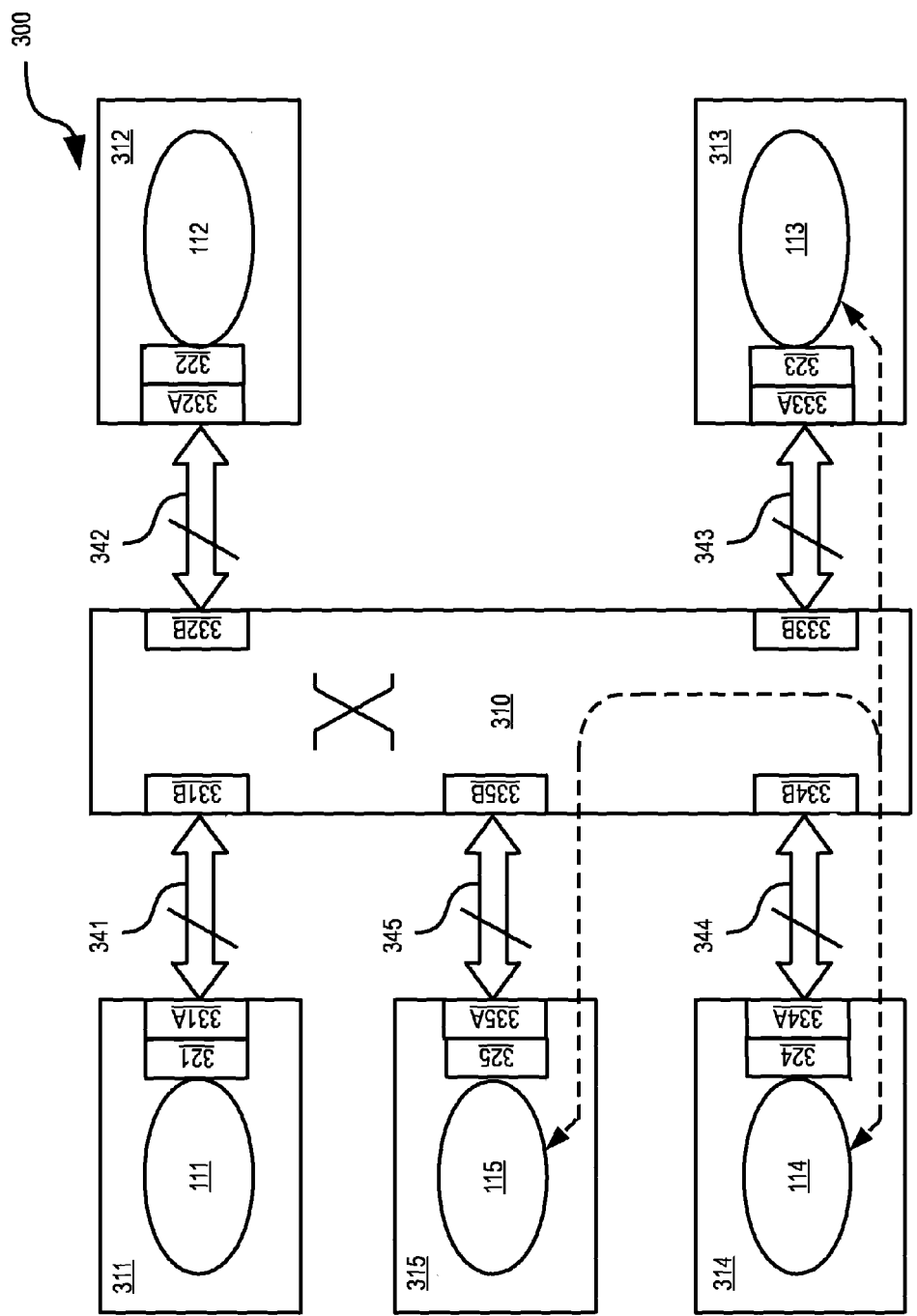
FIG. 3 is a diagram illustrating an example connection of the logic blocks of the design of FIG. 1A according to another embodiment of the present invention.

FIG. 3 is a diagram 300 of an embodiment including a packet switch 310 that is capable of routing packets between all parts of the design in a plurality of FPGAs 311,312,313, 314,315 by examining the destination address in the header of each packet. SerDes lanes 341 and SerDes pair 331A,331B connects logic block 111 to the packet switch 310; SerDes lanes 342 and SerDes pair 332A,332B connects logic block 112 to the packet switch 310; SerDes lanes 343 and SerDes pair 333A,333B connects logic block 113 to the packet switch 310; SerDes lanes 344 and SerDes pair 334A,334B connects logic block 114 to the packet switch 310; and SerDes lanes 345 and SerDes pair 335A,335B connects logic block 115 to the packet switch 310. For example, packets launched from FPGA 314 that is destined to FPGA 313, will have a destination address that is different from packets that are destined to other FPGAs. Bridge 324 inserts the destination addresses into packets that are launched from FPGA 314. Similarly, bridges 321, 322, 323, and 325 insert destinations addresses from FPGAs 311, 312, 313 and 315 respectively. The SerDes pairs 331A,331B to 335A,335B are preferably implemented as hard blocks in the respective FPGAs 311 to 315 and packet switch 310.

An advantage of using high speed SerDes is the significant reduction in the number of I/O signals required to transfer data, hence the constraint due to the number of I/O pins available in an FPGA is now alleviated. In addition, an apparatus utilizing both a packet switch and a standard packet based SerDes technology, such as for example a PCIe interface, creates a very scalable architecture that can be expanded to many FPGAs, using the same hardware and changing the configuration by software means, given that the packet switch can support the additional SerDes lanes. However, due to the asynchronous nature of SerDes, flight times of packets may be variable depending on factors such as an amount of traffic loading on the packet switch 310.

In replacing the synchronized parallel buses 131 to 135 of FIG. 2 with a high speed SerDes 341 to 345 as shown in FIG. 3, however, a clock is absent, and therefore the data is transferred between different parts of the design in packets can be out of synch. An embodiment of the present invention includes a method for synchronizing the packets between the plurality of FPGAs including calculating a flight time of the data packet, a reference clock that is sourced by all parts of the design in the plurality of FPGAs, inserting timestamps into the packets at a transmit end of the SerDes lanes and extracting timestamps from the packets at the receive end of the SerDes and interpreting the timestamps.

Figure 4:
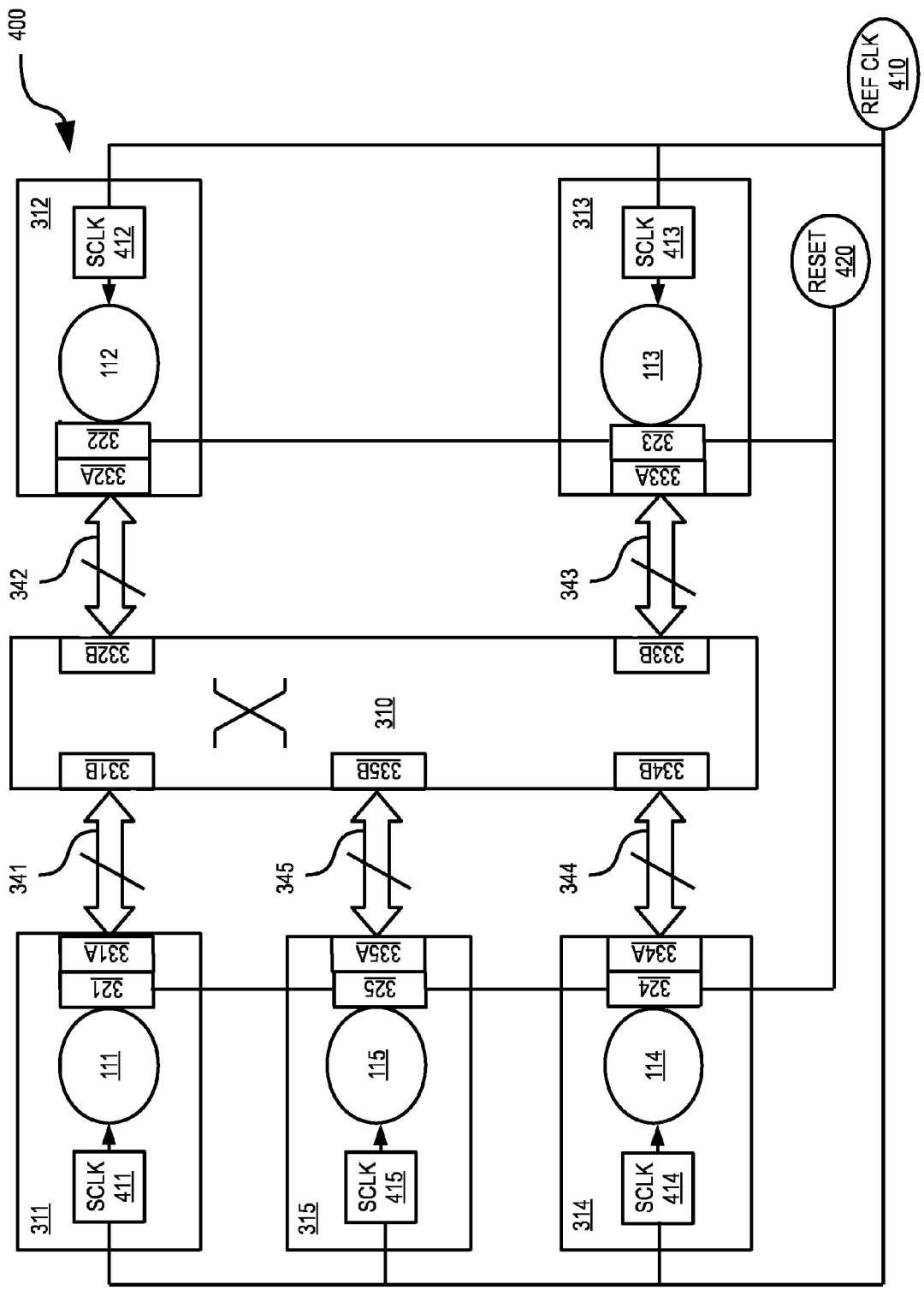
FIG. 4 is a diagram illustrating inclusion of a common reference clock and reset signal in the example connection of the design shown in FIG. 3.

A diagram 400 of an embodiment of the preset invention is shown in FIG. 4. Common clock sources REF_CLK 410 and a common RESET 420 are used to synchronize logic in bridges 311, 312, 313, 314 and 315. Clock dividers 411, 412, 413, 414 and 425 in each respective FPGA 311,312,313,314, 315 that divide the REF_CLK 410 by n, where n is an integer number, to generate SCLK, which is much slower than REF_CLK 410, for example x10, and is frequency and phase synchronized to REF_CLK 410. SCLK is further used to drive all or parts of logic blocks 111, 112, 113, 114 and 115. SCLK drives all or part of the logic under test (not shown).

Figure 5:
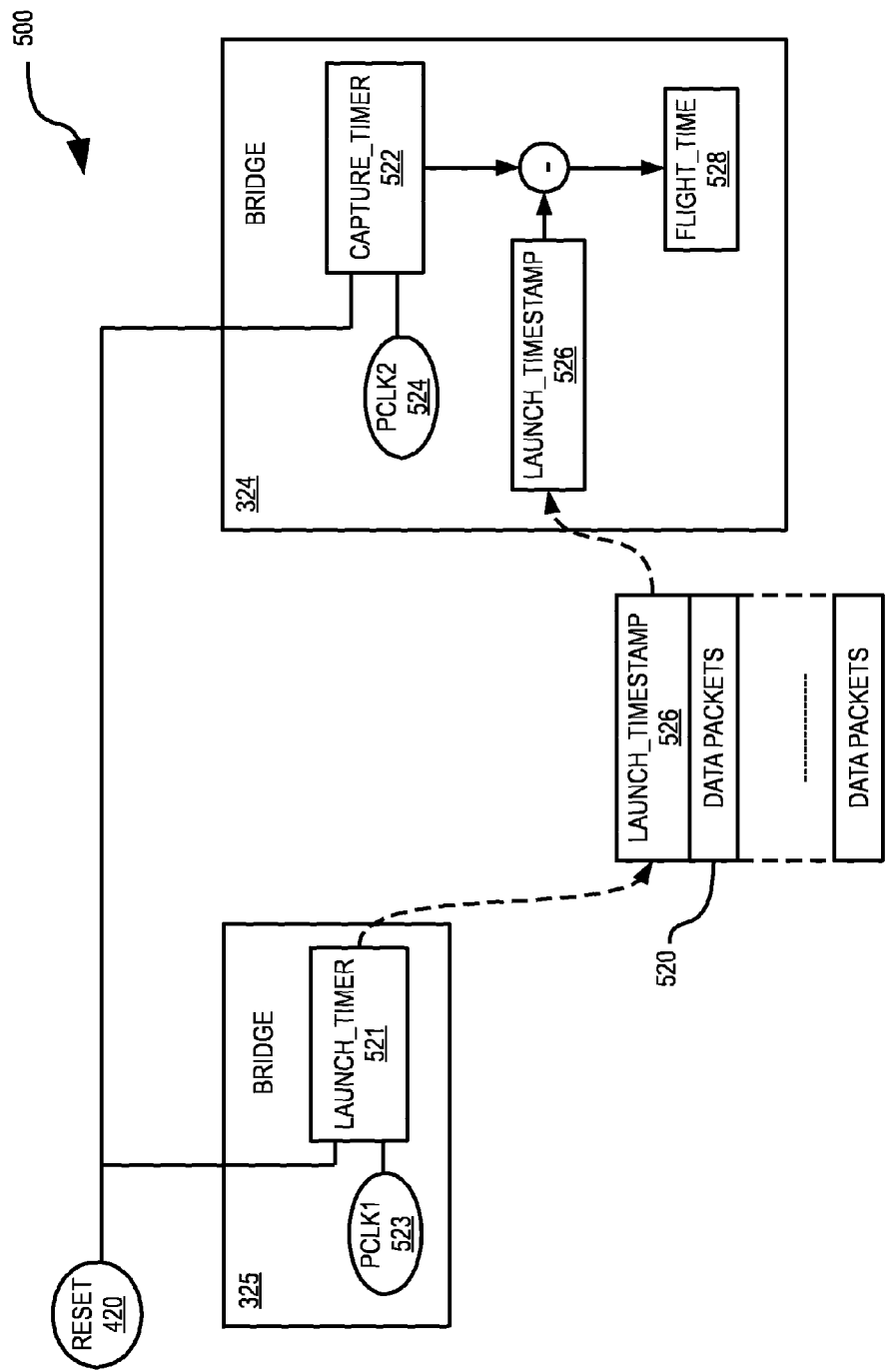
FIG. 5 is a diagram illustrating a method of calculating a packet flight time according embodiments of the present invention.

Referring to FIG. 5 there is shown a block diagram 500 of the bridges 325,324 in the respective FPGAs 314,315. Bridges 321, 322, 323, 324 and 325 each include a mechanism for calculating the flight time that the packet travels between the transmit bridge and receive bridge. The flight time is used in determining a maximum frequency of system clock SCLK. LAUNCH_TIMER 521 and CAPTURE_TIMER 522 are free running counters that are synchronized at the beginning of the operation by RESET 420 signal. Furthermore, launch timers 521 and 522 are driven by clock sources PCLK1 523 and PCLK2 524, which are much faster than SCLKs 414,415. The transmitting bridge 325 inserts a LAUNCH_TIMESTAMP 526 in every outgoing packet 520 that is transferred through the SerDes lanes 341,342,343,344, 345. At the receive end, the receive bridge 324 extracts the LAUNCH_TIMESTAMP 526 from every incoming packet 520 from the SerDes lanes 341,342,343,344,345. Further, the actual flight time 528(FLIGHT_TIME) of each packet is calculated by subtracting the value of CAPTURE_TIMER 522 from the LAUNCH_TIMER 521.

As described in detail below, embodiments of the present invention include a method for calculating the maximum clock frequency of SCLK at which the logic blocks 111,112, 1113,114,115 can run and still achieve deterministic latency of packets from the transmitting logic block 325 to the receive logic block 324.

Figure 6A:
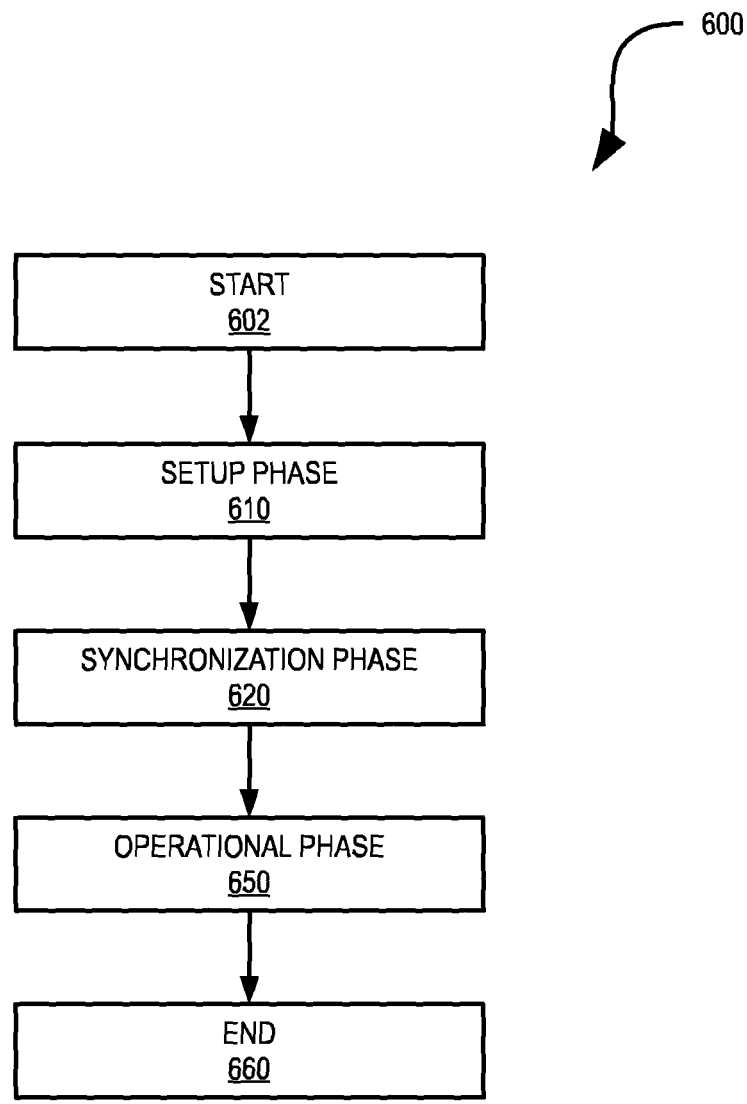
FIGS. 6A to 6D is a flow chart illustrating a method of synchronizing the logic blocks shown in FIG. 4.
Figure 6B:
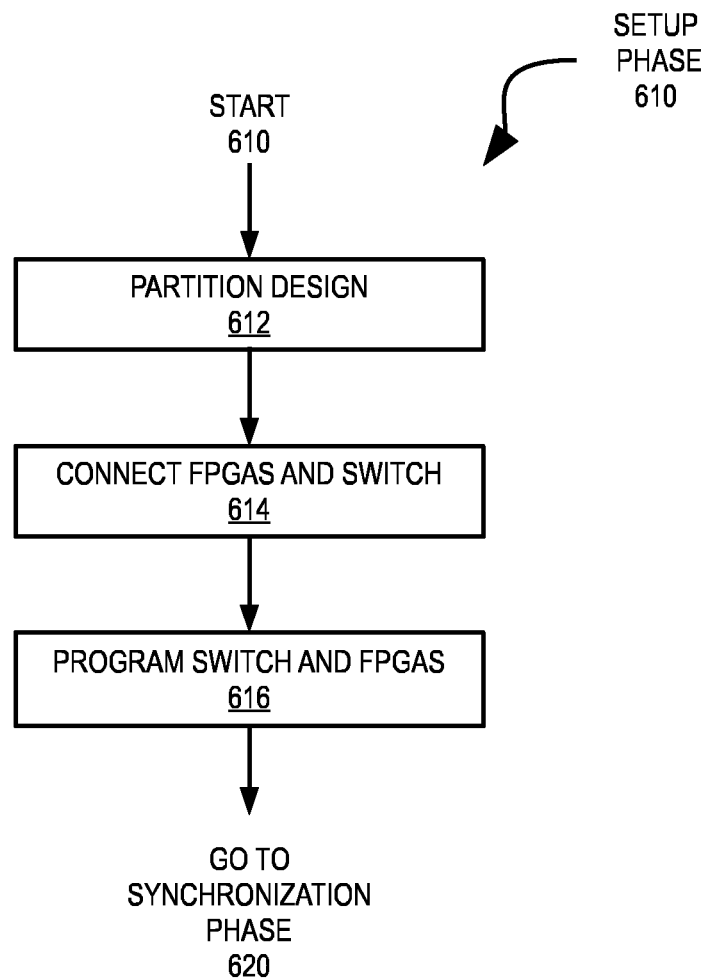
Figure 6C:
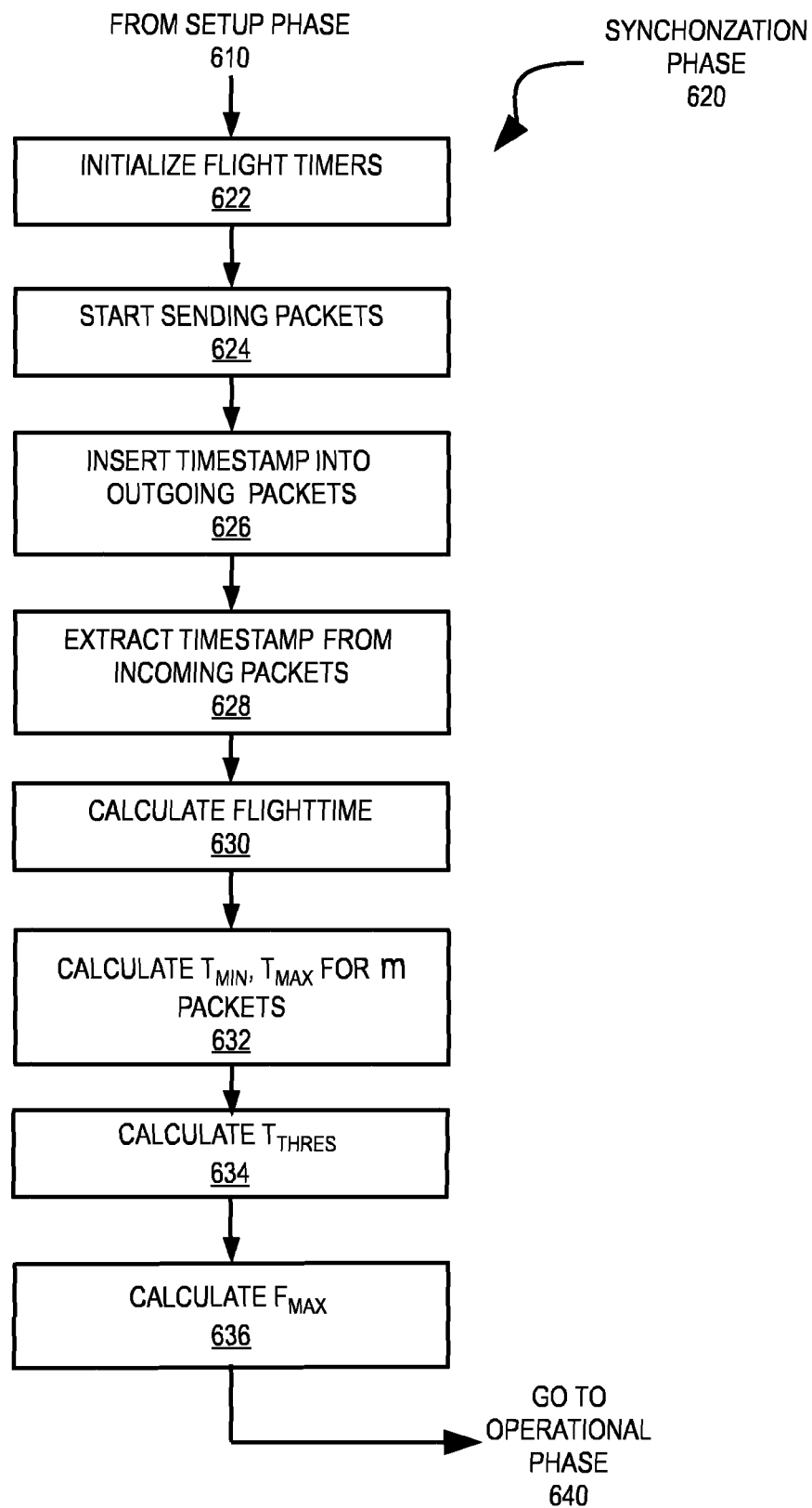
Figure 6D:
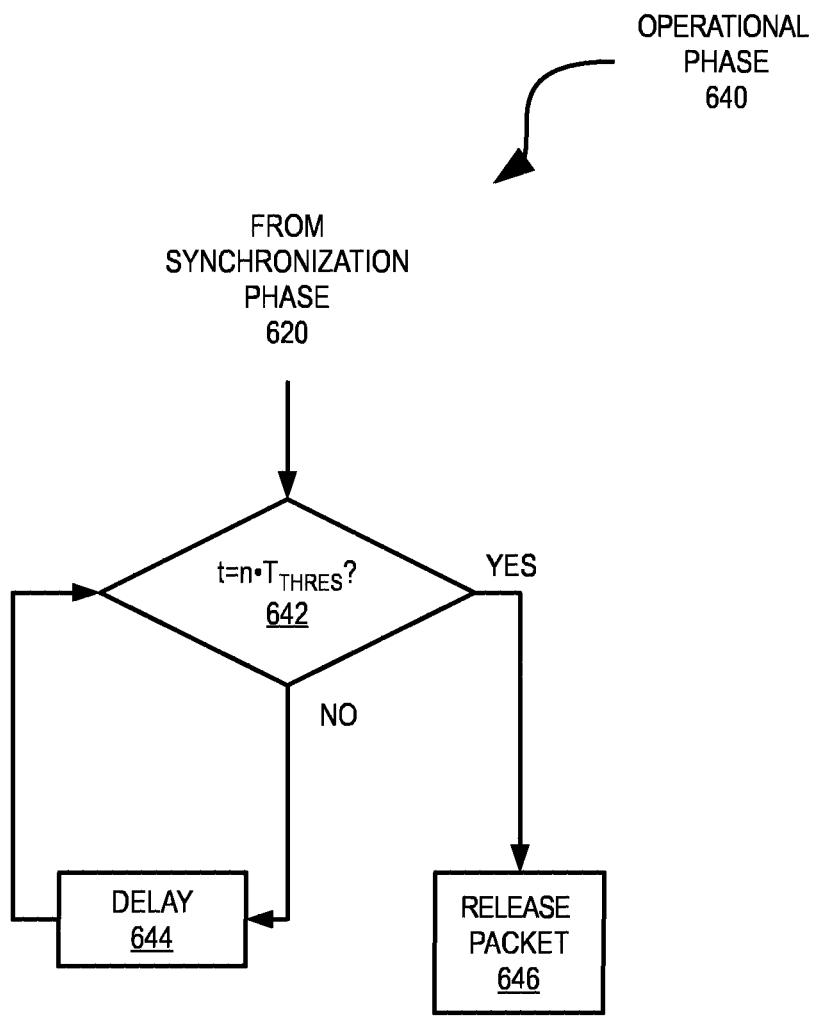
Figure 7:
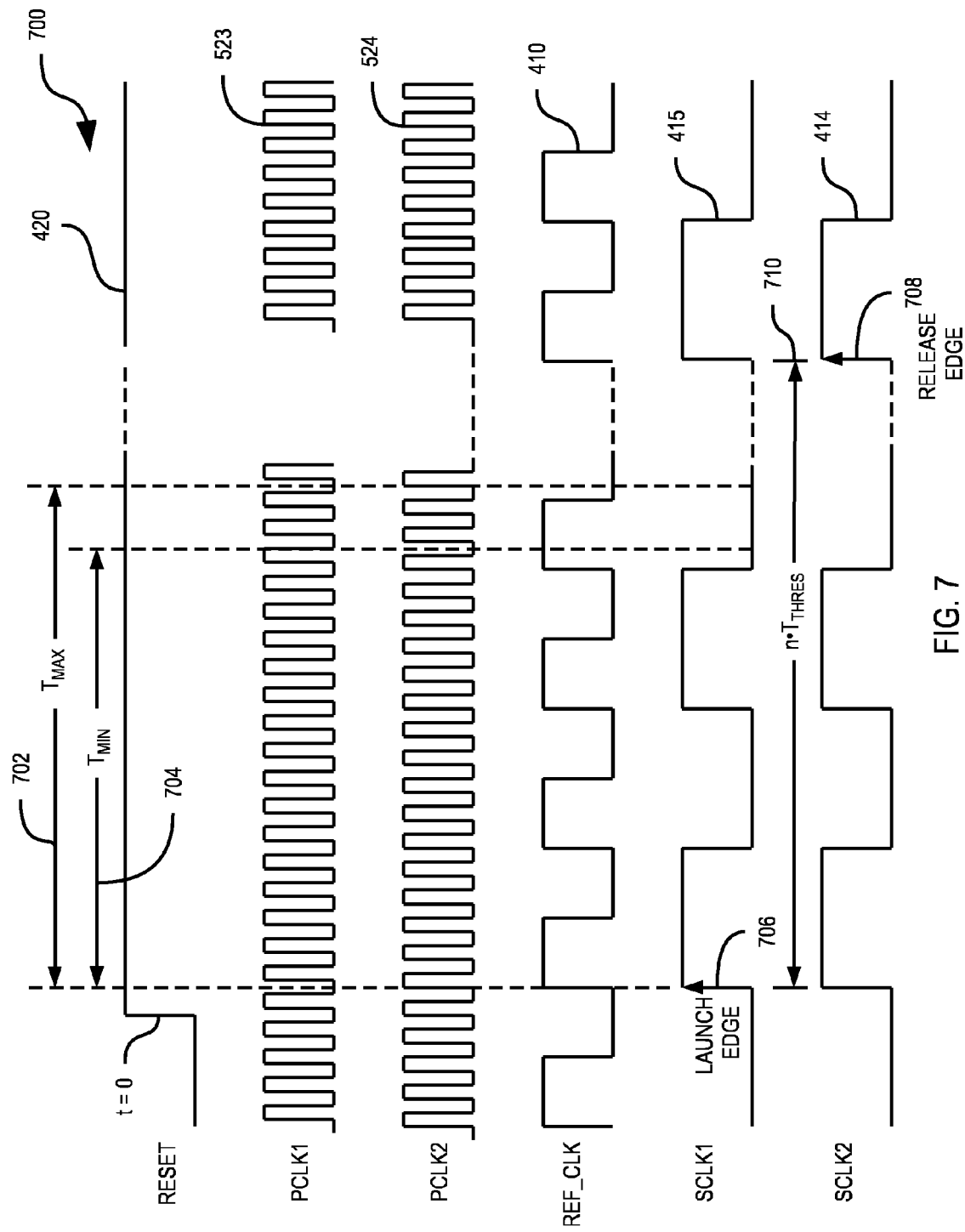
FIG. 7 is timing diagram showing timing of clock signals shown in FIGS. 4 and 5.
Figure 8A:
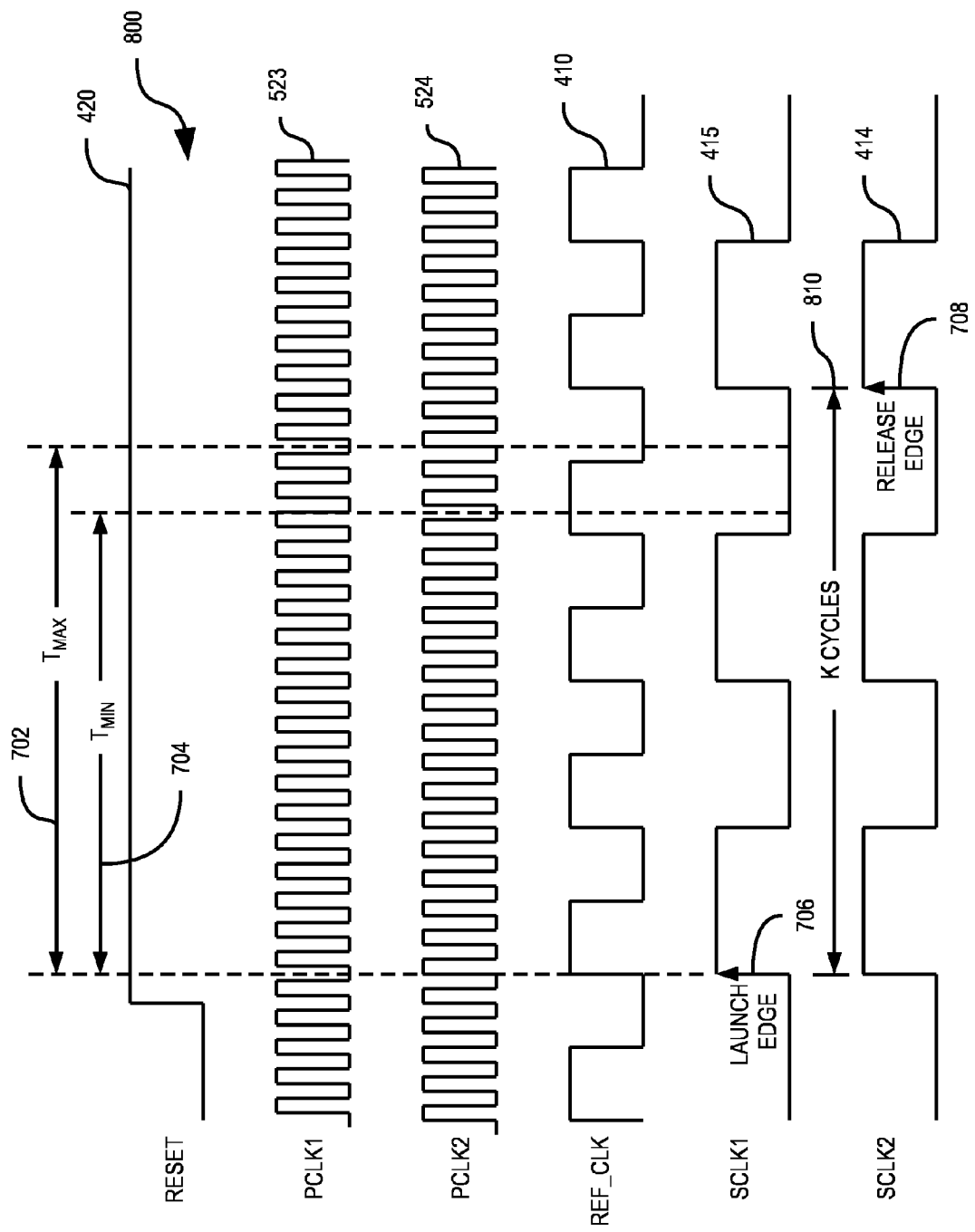

FIG. 6A is a flow chart illustrating an overview of a method 600 for partitioning a design and synchronizing packets traveling between different logic blocks of the partitioned design. Advantageously, the method provides deterministic latency of packets traveling between different logic blocks of the partitioned design. FIGS. 6B to 6D are flowcharts showing details of the processes shown in FIG. 6A. FIGS. 7, 8A, and 8B are timing diagrams showing signals referenced in the description of the flowcharts of FIGS. 6B to 6D.

The method 600 includes three phases. A startup phase 610, FIG. 6B, includes partitioning a design 612 as described above with reference to FIGS. 1A to 4. Then a plurality of programmable devices such as FPGAs and packet switches are operably connected 614 according to the partitioned design. Each of the programmable devices preferably includes a SerDes as described above with reference to FIGS. 2 to 4. Then the programmable devices are programmed 616 to include the respective logic blocks and bridges according to the partitioned design as described above with reference to FIGS. 3 and 4. Programming the bridges includes setting a respective destination address for packets transmitted from each SerDes. The switches are programmed to provide the desired operable connectivity according the partitioned design.

Referring now to FIG. 6C, the synchronization phase includes initializing the flight timers 622 including the LAUNCH_TIMERs and CAPTURE_TIMERs as described above with reference to FIG. 5. Next the logic blocks start sending packets. Each respective logic block, as described above with reference to FIG. 3, sends packets to its respective destination address as specified in 616. A respective timestamp is inserted 626 into each outgoing packet from a respective launch timer as described above with reference to FIG. 5. Then the timestamps are extracted 628 from incoming packets in each programmable device as described above with reference to FIG. 5. A respective flight time ($T_{FL}$) is calculated for each packet arriving at each programmable device. Each respective flight time ($T_{FL}$) is calculated 630:

$$T_{FL} = CAPTURE\_TIMER - LAUNCH\_TIMESTAMP$$

as describe above with reference to FIG. 5.

After a plurality of packets has been received at each of the programmable devices, respective maximum flight times 702 ($T_{MAX}$) and minimum flight times 704 ($T_{MIN}$) are determined 632 after a predetermine number (m) of packets have been received.

Then an allowed threshold flight time ($T_{THRES}$) is calculated 634 based on a predetermined percentage higher than ($T_{MAX}$), for example 10% higher, or alternatively between 0% to 15% higher, or yet alternatively between 0% and 25% higher than $T_{MAX}$.

Optionally, a maximum frequency ($F_{MAX}$) of SCLK may be calculated 636 based on the maximum flight time 702 ($T_{MAX}$) and min flight time 704 ($T_{MIN}$). $F_{MAX}$ is a maximum clock frequency at which logic blocks can run and still achieve deterministic latency of packets from a transmitting programmable device to a receiving programmable device. $F_{MAX}$ is determined using the following equation:

$$F_{MAX} = 1/(T_{MAX} - T_{MIN})$$

FIG. 8A illustrates timing of an example of transmitting and receiving a packet from one programmable device to another where the period of SCLK may be less than the minimum flight time ($T_{MIN}$). It is noted that in this case the data may arrive at the receiving programmable device after a fixed number of "k" SCLK cycles 810, where k is an integer greater than 1. FIG. 8A shows a timing diagram 800 showing timing relationships of the RESET signal 420, PCLK1 523, PCLK2 524, REF_CLK 410, SLCK 1 415, and SLCK2 414 described above with reference to FIGS. 4 and 5. $T_{MAX}$ 702 and $T_{MIN}$ 704 represent the maximum and minimum flight times determined in process 632 described above.

Referring to FIG. 8B, if it is required that the data packet has to arrive at the receive end in the next clock cycle, then the duration 812 of SCLK has to be greater than the maximum flight time 702 ($T_{MAX}$). The timing diagram 802 shown in FIG. 8B is similar to the timing diagram 800 of FIG. 8A except that the duration 812 of SCLK 414,415 is greater than the maximum flight time 702 ($T_{MAX}$) and hence the data packet arrives at the receive end in the next clock cycle.

After the calculation of $F_{MAX}$, the synchronization phase 620 ends and the method enters into the operational phase 640, FIG. 6D.

In the operational phase 640, the flight time T of each packet received at each FPGA is continuously compared 642 with "n" multiplied by the respective $T_{THRES}$ 710 calculated in process 634, where "n" is a predetermined integer. If the result is true the packet is released 646 at a release edge 708 to the respective logic blocks 111,112,113,114,115, otherwise bridges 321, 322, 323, 324 and 325 will delay 644 the packet until processes 642 is true, thereby synchronizing timing between the logic blocks 111,112,113,114,115. Referring to FIG. 7 there is shown a timing diagram 700 showing timing relationships of the RESET signal 420, PCLK1 523, PCLK2 524, REF_CLK 410, SLCK1 415, and 12 414. $T_{MAX}$ 702 and $T_{MIN}$ 704 represent the respective maximum and minimum flight times determined in process 632 described above. In FIG. 7, $n \cdot T_{THRES}$ 710 shows the delay before the release of a packet as described in process 640 above. In the operational phase 640, release of any subsequently received packets will be synchronized with respect to the launch edge 706 and release edge 708 as shown in FIGS. 7, 8A, and 8B.

Thus, an improved method and system for partitioning a design across multiple programmable devices have been presented. In the methods described above, all the packets are delayed by a certain amount of time, which is greater than the maximum flight time, so that the variation in flight times, which is the problem to be solved, disappears. In the embodiments of the invention, delaying a release of a packet received by the second circuit block is performed by an amount of time based on the plurality of flight times for synchronizing the release of the packet, whereby the release of the packet and a release of a subsequent packet are delayed by the same amount of time based on the plurality of flight times.

Although the embodiments of the invention have been described in detail, it will be apparent to one skilled in the art that variations and modifications to the embodiment may be made within the scope of the following claims.

| Table of Elements | |
|---|---|
| 100 | Block diagram of an example integrated circuit design |
| 110 | Top level design |
| 111 to 115 | Logic blocks of the top level design |
| 120 | Block diagram of the design with the logic block implemented in Field Programmable Gate Arrays (FPGAs) |
| 121 to 125 | FPGAs |
| 131 to 135 | Wire bus connections between the FPGAs |
| 200 | Block diagram of the design with the FPGAs connected using Serializer-Deserializer (SerDes) |
| 231 to 235 | SerDes connections between the FPGAs |
| 241A, 241B, 242A, 242B, 243A, 243B, 244A, 244B, 245A, 245B | SerDes pairs |
| 300 | Block diagram of the design with the FPGAs connected using Serializer-Deserializer (SerDes) and a packet switch |
| 310 | Packet switch |
| 311 to 315 | FPGAs having SerDes implemented as hard blocks |
| 321 to 325 | Bridges |
| 331A, 331B, 332A, 332B, 333A, 333B, 334A, 334B, 335A, 335B | SerDes pairs |
| 400 | Block diagram of the design with RESET and REF_CLK |
| 410 | REF_CLK |
| 420 | RESET |
| 500 | Block diagram of example bridges |
| 520 | Packet |
| 521 | LAUNCH_TIMER |
| 522 | CAPTURE_TIMER |
| 523, 524 | PCLK1, PCLK2 |
| 526 | LAUNCH_TIMESTAMP |
| 600 | Flowchart of a method of the invention |
| 610 | Setup phase |
| 620 | Synchronization phase |
| 640 | Operational phase |
| 612 to 616 | Processes of the setup phase |
| 622 to 636 | Processes of the synchronization phase |
| 642 to 646 | Processes of the operational phase |
| 700, 800, and 802 | Timing diagrams of the synchronization phase |
| 702 | Maximum flight time ($T_{MAX}$) |
| 704 | Minimum flight time ($T_{MIN}$) |
| 706 | Launch edge |
| 708 | Release edge |
| 710 | Time to wait to release packet |
| 810 | Delay of K cycles |
| 812 | Delay of one cycle |

The invention claimed is:

1. A method for partitioning a circuit, comprising:
employing a hardware processor for performing at least one of:
partitioning a circuit to comprise a first programmable device having a first SerDes (serializer/deserializer) and a second programmable device having a second SerDes;
operably connecting the first SerDes and the second SerDes;
sending a plurality of packets having a respective plurality of timestamps from the first SerDes;
receiving the plurality of packets by the second SerDes;
determining a respective plurality of flight times of the plurality of packets from the respective plurality of timestamps;
delaying a release of a packet received by the second SerDes based on the plurality of flight times for synchronizing the release of the packet;
determining a maximum flight time and a minimum flight time from the respective plurality of flight times; and
determining a maximum frequency of a clock as a function of the maximum flight time and the minimum flight time.

2. The method as claimed in claim 1, wherein the maximum frequency of the clock is inversely proportional to a difference between the maximum flight time and the minimum flight time.

3. The method as claimed in claim 1, wherein a duration of the clock is greater than the maximum flight time.

4. A system for partitioning a circuit, the system comprising:
a first programmable device having a first SerDes (serializer/deserializer);
a second programmable device having a second SerDes;
an operable connection between the first SerDes and the second SerDes;
wherein the first programmable device is configured to send a plurality of packets from the first SerDes and the second programmable device is configured to receive the plurality of packets by the second SerDes;
wherein the system is further configured to:
determine the plurality of flight times from a respective plurality of timestamps of the plurality of packets;
determine a maximum flight time from the respective plurality of flight times; and
delay a release of a packet received by the second SerDes by at least the maximum flight time.

5. The system as claimed in claim 4 wherein the first SerDes and the second SerDes are PCIe (Peripheral Component Interconnect Express).

6. The system as claimed in claim 4 wherein the second programmable device is further configured to:
calculate a threshold time which is greater than the maximum flight time; and
delay the release of the packet received by the second SerDes by one or more said threshold times.

7. The system as claimed in claim 4 wherein the second programmable device is further configured to:
determine a minimum flight time from the respective plurality of flight times; and
determine a maximum frequency of a clock of the second programmable device as a function of the maximum flight time and the minimum flight time.

8. The system as claimed in claim 7, wherein a duration of the clock is greater than the maximum flight time.

9. The system as claimed claim 7, wherein the maximum frequency of the clock is inversely proportional to a difference between the maximum flight time and the minimum flight time.

10. The system as claimed in claim 4, wherein:
the first programmable device comprises a first timer for providing the plurality of timestamps; and
the second programmable device comprises a second timer for providing a plurality of capture times and is further configured to calculate the respective plurality of flight times based on the respective plurality of timestamps and the respective plurality of capture times.

11. The system as claimed in claim 10, wherein the first programmable device and the second programmable device share a common reset signal and a common reference clock signal.

12. A method for partitioning a circuit, comprising:
employing a hardware processor for performing at least one of:
partitioning a circuit to comprise
a first programmable device having a first SerDes (serializer/deserializer);
and a second programmable device having a second SerDes;
operably connecting the first SerDes and the second SerDes;
sending a plurality of packets having a respective plurality of timestamps from the first SerDes;
receiving the plurality of packets by the second SerDes;
determining a respective plurality of flight times of the plurality of packets from the respective plurality of timestamps;
determining a maximum flight time from the respective plurality of flight times; and
delaying a release of a packet received by the second SerDes by at least the maximum flight time for synchronizing the release of the packet.

13. The method as claimed in claim 12, further comprising:
determining a threshold time, which is greater than the maximum flight time; and
wherein the delaying comprises delaying the release of the packet by one or more said threshold times.

14. The method as claimed in claim 13 further comprising:
determining a minimum flight time from the respective plurality of flight times; and
calculating a maximum frequency of a clock as a function of the maximum flight time and the minimum flight time.

15. The method as claimed in claim 14, wherein the maximum frequency of the clock is inversely proportional to a difference between the maximum flight time and the minimum flight time.

16. The method as claimed in claim 14, wherein a duration of the clock is greater than the maximum flight time.

17. A system for partitioning a circuit, comprising:
means for partitioning a circuit to comprise a first programmable device having a first SerDes (serializer/deserializer) and a second programmable device having a second SerDes;
means for operably connecting the first SerDes and the second SerDes;
means for sending a plurality of packets having a respective plurality of timestamps from the first SerDes;
means for receiving the plurality of packets by the second SerDes;
means for determining a respective plurality of flight times of the plurality of packets from the respective plurality of timestamps;
means for determining a maximum flight time from the respective plurality of flight times; and
means for delaying a release of a packet received by the second SerDes by at least the maximum flight time for synchronizing the release of the packet.

18. The system as claimed in claim 17, further comprising:
means for determining a threshold time, which is greater than the maximum flight time; and
means for delaying the release of the packet by one or more said threshold times.

19. The system as claimed in claim 17 further comprising:
means for determining a minimum flight time from the respective plurality of flight times; and
means for determining a maximum frequency of a clock as a function of the maximum flight time and the minimum flight time.

20. The system of claim 19, wherein a duration of the clock being greater than the maximum flight time.

21. The system as claimed in claim 19, wherein the maximum frequency of the clock is inversely proportional to a difference between the maximum flight time and the minimum flight time.

22. The system as claimed in claim 17 wherein the first SerDes and the second SerDes are PCIe (Peripheral Component Interconnect Express).

23. A system for partitioning a circuit, comprising:
a first programmable device having a first SerDes (serializer/deserializer);
a second programmable device having a second SerDes;
an operable connection between the first SerDes and the second SerDes;
the system being configured to:
send a plurality of packets having a respective plurality of timestamps from the first SerDes;
receive the plurality of packets by the second SerDes;
determine a respective plurality of flight times of the plurality of packets from the respective plurality of timestamps;
delay a release of a packet received by the second SerDes based on the plurality of flight times for synchronizing the release of the packet;
determine a maximum flight time and a minimum flight time from the respective plurality of flight times; and
determine a maximum frequency of a clock as a function of the maximum flight time and the minimum flight time.

24. The system of claim 23, wherein a duration of the clock being greater than the maximum flight time.

25. The system as claimed claim 23, wherein the maximum frequency of the clock is inversely proportional to a difference between the maximum flight time and the minimum flight time.

26. The system as claimed in claim 23 wherein the first SerDes and the second SerDes are PCIe (Peripheral Component Interconnect Express).

* * * * *